United States Patent [19]

Treharne

[11] Patent Number: 4,915,915
[45] Date of Patent: Apr. 10, 1990

[54] WATER-POWDERED PIEZOELECTRIC UNIT FOR PRODUCING NITROGEN FERTILIZER

[76] Inventor: Richard W. Treharne, 13512 Lakevining Dr. Apt. 15102, Orlando, Fla. 32821

[21] Appl. No.: 256,867

[22] Filed: Oct. 11, 1988

[51] Int. Cl.$^4$ .................. B01J 19/08; B01J 19/12; C01B 21/03; C01B 21/24
[52] U.S. Cl. .................. 422/186.24; 422/186.21; 422/186.23; 422/904; 204/179; 204/178; 239/8; 239/369; 239/398; 423/405
[58] Field of Search .................. 422/186.21, 186.22, 422/186.23, 186.24, 904; 239/8, 289, 369, 398; 71/53, 54; 423/405

[56] References Cited

U.S. PATENT DOCUMENTS

| | | | |
|---|---|---|---|
| 4,010,090 | 3/1977 | Fey et al. | 422/186.24 |
| 4,010,897 | 3/1977 | Treharne et al. | 239/8 |
| 4,141,715 | 2/1979 | Wyse et al. | 422/186 |
| 4,287,040 | 9/1981 | Alamaro | 422/186.24 |
| 4,297,123 | 10/1981 | Wyse et al. | 422/186 |
| 4,559,206 | 12/1985 | Treharne et al. | 422/186.24 |

Primary Examiner—Howard J. Locker

[57] ABSTRACT

A system for producing nitrogen fertilizer using an electric arc process is described in which the electric arc necessary for the process is generated by piezoelectric elements actuated by a hammer mechanism powered by water pressure such as from a garden hose. The nitrogen oxides produced by the arc discharge are drawn into the water to serve as a source of nitrogen fertilizer. The net result of the invention is that the operator can provide nitrogen fertilizer as he supplies water to the same area. The only inputs to this system are air and a source of water under pressure.

1 Claim, 1 Drawing Sheet

WATER-POWDERED PIEZOELECTRIC UNIT FOR PRODUCING NITROGEN FERTILIZER

The electric arc process for producing nitrogen fertilizer from air is well known and in fact; the electric arc process for producing nitrogen fertilizer has been the basic process used in several patents (e,g, U.S. Pat. No. 4256,967 (Mar. 17, 1981) and U.S. Pat. No. 4,559,206 Treharne et al. Dec. 17, 1985 granted to Treharne (the present inventor, et al.) Also the concept of feednitrogen fertilizer produced by the electric arc process into a garden hose to permit fertilizing a lawn or garden while watering is covered under U.S. Pat. No. 4,010,897 Treharne et.al. dated Mar. 8, 1977.

However, one short coming of the system described in U.S. Pat. No. 4,010,897 (Treharne et al.) is that the danger of a serious electrical shock hazard could exist while using the electric arc process in conjunction with a lawn water hose. The invention described here uses an electric arc to produce nitrogen fertilizer but eliminates the electrical shock hazard of the system described in Pat. No. 4,010,897 Treharne et al. (Mar. 8, 1977).

DISCRIPTION OF DRAWING

FIG. 1. shows the complete water-powered piezoelectric system for producing nitrogen fertilizer, including one means for siphoning the nitrogen oxide (the source of the nitrogen fertilizer into a water source such as a lawn or garden water hose).

The system described in this invention produces the electric arc needed to make nitrogen fertilizer by the use of a piezoelectric crystal or crystals that are actuated by water power. The invention is shown in detail in FIG. 1.

The piezoelectric element or elements labeled 7 in FIG. 1. are actuated by "hammer element (labeled 6 in FIG. 1.) The hammer element (8) may be driven by a spring element labeled 5 in FIG. 1. The spring element (5) in turn is to be powered by a water powered water power such as indicated by the water powered turbine blade turbine blade (labeled 3 in FIG. 1.). The turbine blade (3) is shown inside a water conduit element (labeled 20 of FIG. 1.). The water conduit (20) may be for example a section of garden hose. In operation the system performs as follows: Water pressure flowing through the conduit (20) turns the turbine blade (3) to actuate the spring mechanism (5) to cause the hammer element (6) to strike the piezoelectric elements or (element) . The striking action of the hammer element on the piezoelectric element creates an electric arc spark discharge (labeled 10 in FIG. 1.) between a center electrode (labeled 11 in FIG. 1.) and a second electrode (labeled 15). Similar to the process described in the related patents referenced, an electric arc discharge in air causes the nitrogen and oxygen of air to combine to form nitrogen oxides. Air enters through the porthole (12) and is drawn through the spark discharge chamber (13) by Venturi action as water flows past the nozzle (labeled 17 in FIG. 1.). At the same time, nitrogen oxides produced in the electric arc chamber (13) are drawn into and absorbed by the water flowing through the water conduit (20). Nitrogen oxides absorbed in water form weak nitric acid that serves as a form of nitrogen fertilizer to fertilize any type of plant life as well as watering the plant life.

The above description describes the basic concepts of this invention. However, to anyone skilled in the art, other modifications to the basic concepts such as variations in the means to actuate the piezoelectric elements may also by used and therefore are considered within the scope of this invention.

What is claimed is:

1. A water-powered piezoelectric unit for producing a nitrogen fertilizer solution from air and water:
    said unit comprising an electric arc generating means constituted by piezoelectric crystals (8) which are actuated by hammer element (6) driven by spring element (5) powered by turbine blade (3) located in conduit (21);
    wherein in operation water flowing through said conduit turns said turbine blade, actuating said spring mechanism which causes said hammer element to strike said piezoelectric crystals causing an electric arc spark discharge which causes nitrogen and oxygen to combine to form said nitrogen fertilizer solution.

* * * * *

UNITED STATES PATENT AND TRADEMARK OFFICE
CERTIFICATE OF CORRECTION

PATENT NO. : 4,915,915

DATED : Apr. 10, 1990

INVENTOR(S) : Richard W. Treharne

Page 1 of 3

It is certified that error appears in the above-identified patent and that said Letters Patent is hereby corrected as shown below:

The title page showing the illustrative figure and columns 1 and 2 should be deleted to appear as per attached pages.

Signed and Sealed this

Nineteenth Day of February, 1991

*Attest:*

HARRY F. MANBECK, JR.

*Attesting Officer*          *Commissioner of Patents and Trademarks*

United States Patent [19]

Treharne

[11] Patent Number: 4,915,915
[45] Date of Patent: Apr. 10, 1990

[54] WATER-POWDERED PIEZOELECTRIC UNIT FOR PRODUCING NITROGEN FERTILIZER

[76] Inventor: Richard W. Treharne, 6517 Banner Lake Circle, Apt. 15101, Orlando, Fla. 32821.

[21] Appl. No.: 256,867

[22] Filed: Oct. 11, 1988

[51] Int. Cl.⁴ .................. B01J 19/08; B01J 19/12; C01B 21/03; C01B 21/24
[52] U.S. Cl. .................. 422/186.24; 422/186.21; 422/186.23; 422/904; 204/179; 204/178; 239/8; 239/369; 239/398; 423/405
[58] Field of Search .................. 422/186.21, 186.22, 422/186.23, 186.24, 904; 239/8, 289, 369, 398; 71/53, 54; 423/405

[56] References Cited

U.S. PATENT DOCUMENTS

| | | | |
|---|---|---|---|
| 4,010,090 | 3/1977 | Fey et al. | 422/186.24 |
| 4,010,897 | 3/1977 | Treharne et al. | 239/8 |
| 4,141,715 | 2/1979 | Wyse et al. | 422/186 |
| 4,287,040 | 9/1981 | Alamaro | 422/186.24 |
| 4,297,123 | 10/1981 | Wyse et al. | 422/186 |
| 4,559,206 | 12/1985 | Treharne et al. | 422/186.24 |

Primary Examiner—Howard J. Locker

[57] ABSTRACT

A system for producing nitrogen fertilizer using an electric arc process is described in which the electric arc necessary for the process is generated by piezoelectric elements actuated by a hammer mechanism powered by water pressure such as from a garden hose. The nitrogen oxides produced by the arc discharge are drawn into the water to serve as a source of nitrogen fertilizer. The net result of the invention is that the operator can provide nitrogen fertilizer as he supplies water to the same area. The only inputs to this system are air and a source of water under pressure.

1 Claim, 1 Drawing Sheet

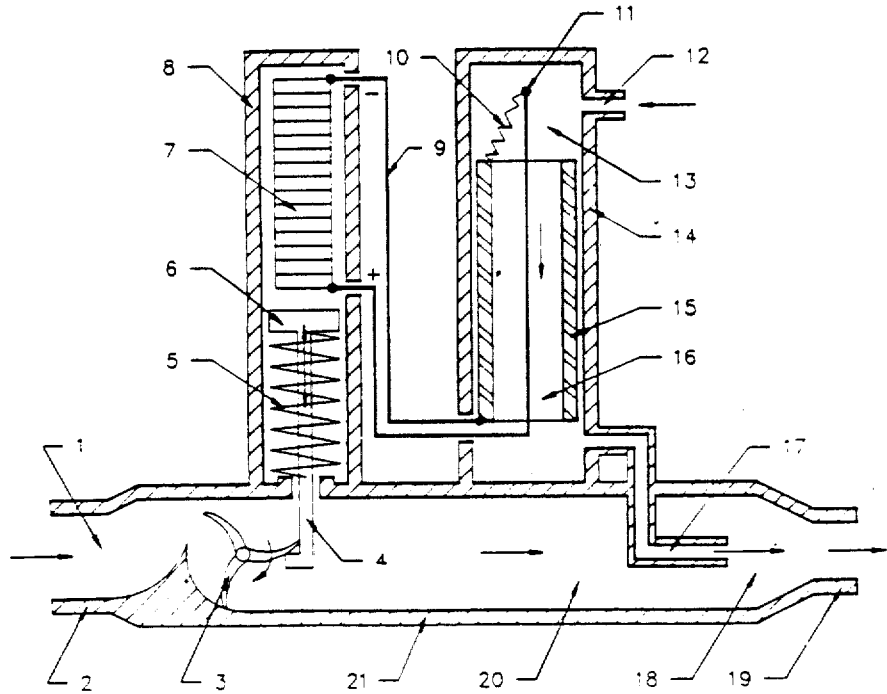

WATER-POWDERED PIEZOELECTRIC UNIT FOR PRODUCING NITROGEN FERTILIZER

The electric arc process for producing nitrogen fertilizer from air is well known and in fact; the electric arc process for producing nitrogen fertilizer has been the basic process used in several patents (e.g., U.S. Pat. No. 4256,967 (Mar. 17, 1981) and U.S. Pat. No. 4,559,206 Treharne et al. Dec. 17, 1985 granted to Treharne (the present inventor, et al.) Also the concept of feednitrogen fertilizer produced by the electric arc process into a garden hose to permit fertilizing a lawn or garden while watering is covered under U.S. Pat. No. 4,010,897 Treharne et.al. dated Mar. 8, 1977.

However, one short coming of the system described in U.S. Pat. No. 4,010,897 (Treharne et al.) is that the danger of a serious electrical shock hazard could exist while using the electric arc process in conjunction with a lawn water hose. The invention described here uses an electric arc to produce nitrogen fertilizer but eliminates the electrical shock hazard of the system described in Pat. No. 4,010,897 Treharne et al. (Mar. 8, 1977).

The system described in this invention produces the electric arc needed to make nitrogen fertilizer by the use of a piezoelectric crystal or crystals that are actuated by water power. The invention is shown in detail in FIG. 1.

Figure 1:
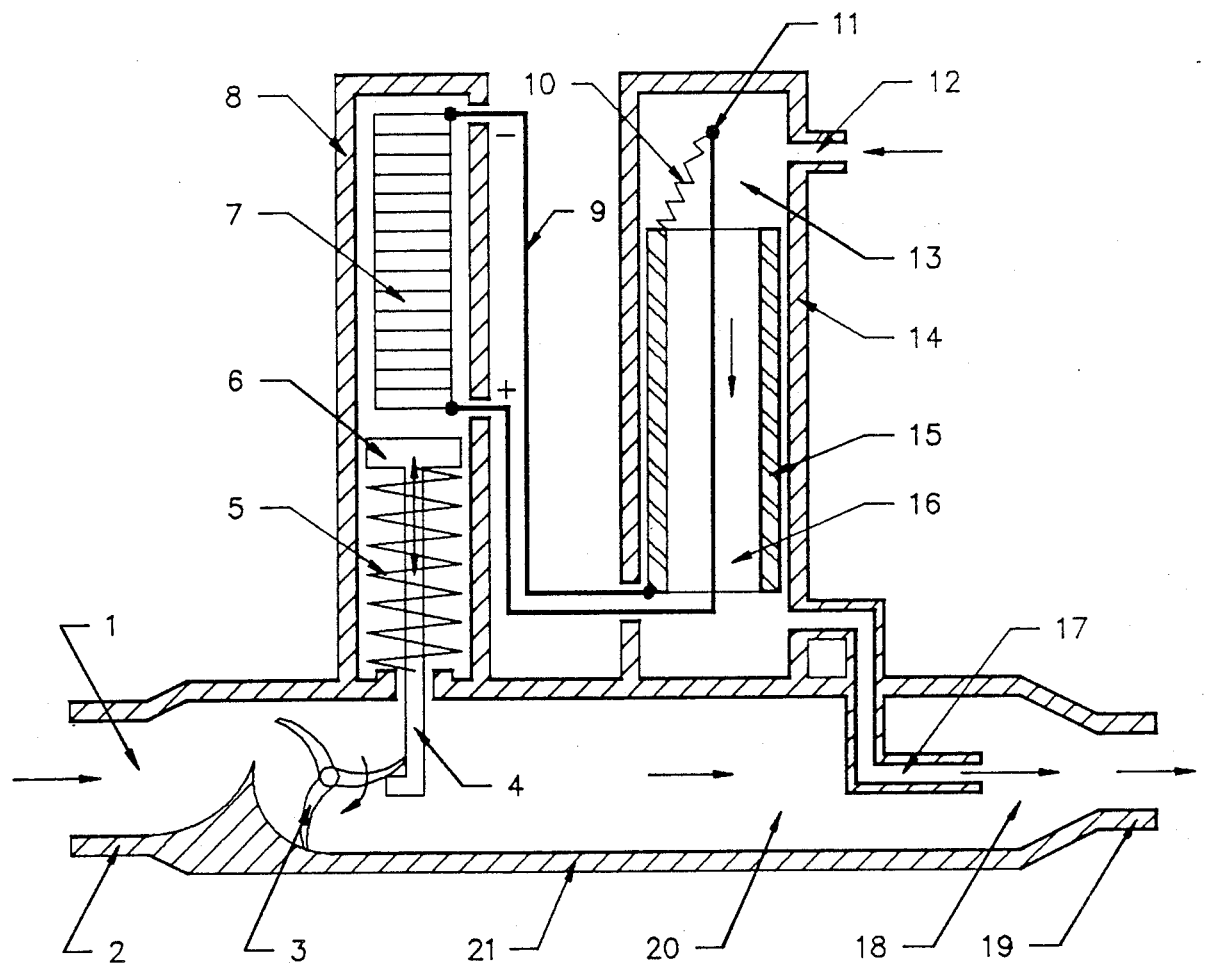
FIG. 1. shows the complete water-powered piezoelectric system for producing nitrogen fertilizer, including one means for siphoning the nitrogen oxide (the source of the nitrogen fertilizer into a water source such as a lawn or garden water hose).
Figure 2:
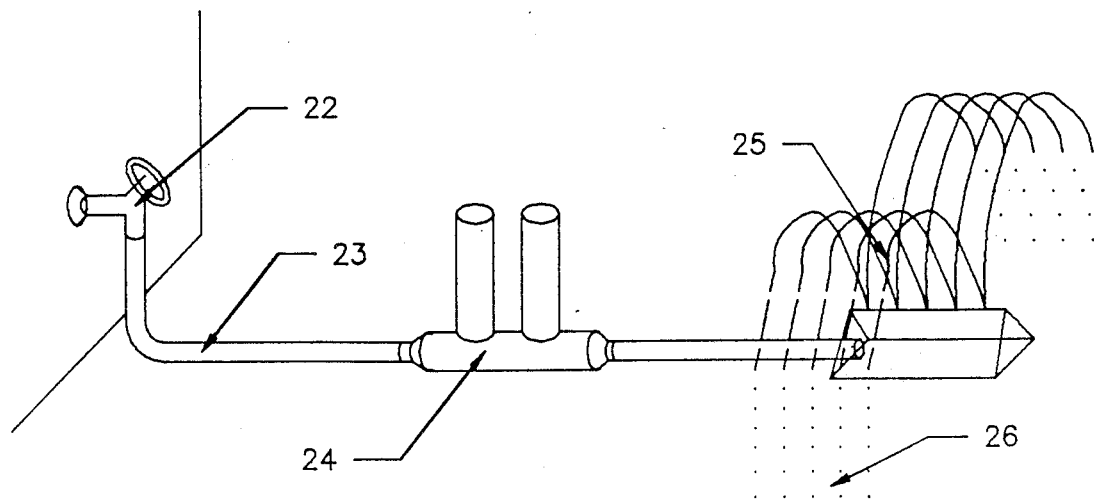

The piezoelectric element or elements labeled 7 in FIG. 1. are actuated by "hammer element (labeled 6 in FIG. 1.) The hammer element (8) may be driven by a spring element labeled 5 in FIG. 1. The spring element (5) in turn is to be powered by water power such as indicated by the water powered turbine blade (labeled 3 in FIG. 1.). The turbine blade (3) is shown inside a water conduit element (labeled 20 of FIG. 1.). The water conduit (20) may be for example a section of garden hose. In operation the system performs as follows: Water pressure flowing through the conduit (20) turns the turbine blade (3) to actuate the spring mechanism (5) to cause the hammer element (6) to strike the piezoelectric elements or (element). The striking action of the hammer element on the piezoelectric element creates an electric arc spark discharge (labeled 10 in FIG. 1.) between a center electrode (labeled 11 in FIG. 1.) and a second electrode (labeled 15). Similar to the process described in the related patents referenced, an electric arc discharge in air causes the nitrogen and oxygen of air to combine to form nitrogen oxides. Air enters through the porthole (12) and is drawn through the spark discharge chamber (13) by Venturi action as water flows past the nozzle (labeled 17 in FIG. 1.). At the same time, nitrogen oxides produced in the electric arc chamber (13) are drawn into and absorbed by the water flowing through the water conduit (20). Nitrogen oxides absorbed in water form weak nitric acid that serves as a form of nitrogen fertilizer to fertilize any type of plant life as well as watering the plant life.

The above description describes the basic concepts of this invention. However, to anyone skilled in the art, other modifications to the basic concepts such as variations in the means to actuate the piezoelectric elements may also by used and therefore are considered within the scope of this invention.

What is claimed is:

1. A water-powered piezoelectric unit for producing a nitrogen fertilizer solution from air and water:
    said unit comprising an electric arc generating means constituted by piezoelectric crystals (8) which are actuated by hammer element (6) driven by spring element (5) powered by turbine blade (3) located in conduit (21);
    wherein in operation water flowing through said conduit turns said turbine blade, actuating said spring mechanism which causes said hammer element to strike said piezoelectric crystals causing an electric arc spark discharge which causes nitrogen and oxygen to combine to form said nitrogen fertilizer solution.

* * * * *